(12) United States Patent
Schook

(10) Patent No.: US 7,846,343 B2
(45) Date of Patent: Dec. 7, 2010

(54) SEPARATOR FOR SEPARATING A SOLID, LIQUID AND/OR GAS MIXTURE

(75) Inventor: Robert Schook, EC Duiven (NL)

(73) Assignee: FMC Technologies C.V., Amsterdam (NL)

(*) Notice: Subject to any disclaimer, the term of this patent is extended or adjusted under 35 U.S.C. 154(b) by 0 days.

(21) Appl. No.: 11/917,851

(22) PCT Filed: Jun. 28, 2006

(86) PCT No.: PCT/NL2006/000320

§ 371 (c)(1),
(2), (4) Date: Nov. 3, 2008

(87) PCT Pub. No.: WO2007/001174

PCT Pub. Date: Jan. 4, 2007

(65) Prior Publication Data

US 2009/0084714 A1    Apr. 2, 2009

(30) Foreign Application Priority Data

Jun. 28, 2005   (NL) .................................... 1029352

(51) Int. Cl.
*B01D 21/26* (2006.01)
(52) U.S. Cl. ..................... 210/787; 210/512.1; 55/456; 55/455; 55/457; 95/269; 209/722
(58) Field of Classification Search .................. 55/456, 55/457, 455; 95/269; 210/512.1, 512.2, 210/513, 787, 788; 366/336–339; 209/715, 209/719, 718, 720, 721, 722
See application file for complete search history.

(56) References Cited

U.S. PATENT DOCUMENTS

| | | | | |
|---|---|---|---|---|
| 2,147,671 A | * | 2/1939 | Pratt | 55/410 |
| 2,413,324 A | | 12/1946 | Holzwarth | 183/79 |
| 2,847,087 A | | 8/1958 | Johnson | 183/80 |
| 2,993,480 A | * | 7/1961 | Huet | 122/34 |
| 3,201,919 A | * | 8/1965 | Long | 95/254 |
| 3,641,745 A | * | 2/1972 | Moore | 55/345 |
| 3,693,329 A | | 9/1972 | Willis | 55/457 |
| 3,754,658 A | * | 8/1973 | Messing | 210/304 |

(Continued)

FOREIGN PATENT DOCUMENTS

WO    WO 99/43439    9/1999

(Continued)

*Primary Examiner*—Tony G Soohoo
*Assistant Examiner*—David C Mellon
(74) *Attorney, Agent, or Firm*—Williams, Morgan & Amerson, P.C.

(57) ABSTRACT

The invention relates to a cyclone separator for separating a mixture containing solid particles, liquid and/or gas into a heavy fraction and a light fraction, the separator comprising:—a casing (2) defining a flow space through which the mixture is to flow;—an elongated flow body (5) arranged in the flow space along which the mixture to be separated can be carried;—at least one swirl inducing element (10) arranged between the flow body and the inner casing, the swirl inducing element being curved so as to set the incoming mixture into a rotating movement for the purpose of separating the mixture into the heavy fraction and the light fraction;—discharge means for discharging the separated heavy and light fraction, wherein the discharge means comprise at least one flow passage defined inside said at least one swirl element.

13 Claims, 6 Drawing Sheets

U.S. PATENT DOCUMENTS

| | | | | |
|---|---|---|---|---|
| 4,179,273 | A | | 12/1979 | Montusi ....................... 55/457 |
| 4,666,476 | A | | 5/1987 | Reeve et al. ................... 55/203 |
| 5,474,601 | A | * | 12/1995 | Choi ............................ 96/182 |
| 5,531,811 | A | * | 7/1996 | Kloberdanz ................. 95/261 |
| 6,039,116 | A | * | 3/2000 | Stevenson et al. ........... 166/263 |
| 2006/0186038 | A1 | * | 8/2006 | Nassif ..................... 210/512.1 |

FOREIGN PATENT DOCUMENTS

| | | |
|---|---|---|
| WO | WO 00/74815 | 12/2000 |
| WO | WO 01/00296 | 1/2001 |
| WO | WO 02/056999 | 7/2002 |
| WO | WO 2004/096406 A1 * | 11/2004 |

* cited by examiner

SEPARATOR FOR SEPARATING A SOLID, LIQUID AND/OR GAS MIXTURE

BACKGROUND OF THE INVENTION

1. Field of the Invention

The present disclosure relates to a cyclone separator for separating a mixture containing solid particles, liquid and/or gas into a heavy fraction and a light fraction.

2. Description of the Related Art

Separating devices for separating such mixtures, such as mixtures of oil and gas, are known in which use is made of the differences in specific weight of the parts of which the mixture is made up. A cyclone separator generally consists of a tube in which a central flow body is arranged. Provided on the flow body are guide fins with which the mixture flowing into the tube under overpressure is brought into rotation. As a result of the centrifugal forces occurring due to the rotation, the relatively heavy fraction of the mixture is flung outward, while the relatively light fraction of the mixture is displaced in a zone along the flow body. Because the light and heavy fractions are displaced in separate zones, a separation of the mixture can be effected by arranging outlet provisions at a suitable location, and the separated light and heavy fractions can be discharged separately.

Cyclone separators are used in a large number of situations. Inlet cyclones are, for instance, applied in gravity separation vessels. Inlet cyclones ensure that the incoming mixture undergoes a determined pretreatment before a further separation takes place. The inlet cyclone is connected for this purpose to the inlet of the gravity separation vessel and is provided with an outlet for the heavy fraction and an outlet for the light fraction, wherein both outlets debouch in the interior of the gravity separation vessel for further separation of the mixture. An example of an inlet cyclone is described in the European patent application EP 1 187 667 A2.

Another type of cyclone separator is the so-called in-line separator in which the incoming mixture and at least a part of the outgoing mixture flows through a pipeline, wherein the separator is essentially aligned with the pipeline. In-line cyclone separators can be subdivided into two different types.

In a first type, also known as a "degasser," the separator separates gas from liquid. The degasser is used, in the case of the gas/liquid mixture, when the continuous phase is liquid. An example of a degasser is known from WO 01/00296 A1. In the degasser, the liquid continuous flow is set into rotation by a number of guide blades causing swirling. Because of the difference in density between the gas and liquid and the initiated centrifugal field, the gas is urged to the middle of the separator, thus producing a stable core of gas. Removal of the gas core is brought about by means of a gas discharge pipe arranged in the middle of the cyclone and provided with outlet openings. Because of the geometry of the separator, removal of the gas via the outlet openings takes place in radial direction.

A second type of in-line cyclone separator is a separator, also referred to as a "deliquidiser," in which a gas continuous feed is set into rotation by a number of guide blades causing swirling. The deliquidiser in this case separates the liquid from the gas. The liquid is urged in the direction of the pipe wall, which results in a stable liquid film (layer) which is displaced in the direction of the gas outlet. In the outlet zone, the gas and the liquid are separated at a fixed position in the flow. The gas outlet is a cylindrical open pipe which is fixed in the flow space of the separator. The gas is discharged in longitudinal direction. An example of a deliquidiser is described in WO 02/056999 A1.

A drawback of the known cyclone separators is that they are relatively bulky, since provisions must be made in the separator for separate discharge of the separated heavy fraction and the separated light fraction. These provisions are usually made downstream of the guide fins, which entails a relatively large minimum length of such cyclone separators.

The present invention is directed to various devices solving, or at least reducing the effects of, some or all of the aforementioned problems.

SUMMARY OF THE INVENTION

The present invention is directed to an improved cyclone separator in which the above-stated drawbacks may be obviated.

Provided for this purpose, according to one illustrative embodiment, is a cyclone separator for separating a mixture containing solid particles, liquid and/or gas into a heavy fraction and a light fraction, wherein the separator comprises:

- a casing defining a flow space through which the mixture is to flow, the casing having an inlet for the mixture to be separated and an outlet for the discharge of either the heavy or light fraction of the mixture;
- an elongated flow body arranged in the flow space along which the mixture to be separated can be carried;
- at least one swirl-inducing element arranged between the flow body and the inner casing, the swirl-inducing element being curved so as to set the incoming mixture into a rotating movement for the purpose of separating the mixture into the heavy fraction and the light fraction; and
- discharge means for discharging the separated heavy and light fraction, wherein the discharge means comprise at least one flow passage defined inside said at least one swirl element.

By making use of the space inside the swirl element, such as, for instance, a guide fin which is wholly or partially hollow or in which one or more channels are provided, at least one of the two fractions (i.e., either the light or the heavy fraction) can already be discharged at the position of the swirl elements, thus enhancing the compactness of the cyclone separator.

In the above-mentioned cyclone separator known in the professional field as a degasser, the light fraction is guided inward downstream of the guide fins into a discharge tube extending centrally in longitudinal direction of the cyclone tube, and is subsequently guided in the direction of the downstream outer end of the cyclone tube. The heavy fraction also continues on its way in longitudinal direction. Although this degasser produces a good separating result, the degasser is quite large in longitudinal direction. In order to reduce the dimensions of such a degasser, there is described herein a cyclone separator, comprising:

- at least one second flow passage defined inside the flow body and connecting to the first flow passage in the swirl element; and
- an outer casing arranged around the inner casing, the outer and inner casing defining a third flow passage connected to the first flow passage;
- wherein the discharge means further comprise one or more openings in the flow body, the openings connecting to the second flow passage inside the flow body so as to discharge the separated light fraction through the openings and the second, first and third passage respectively.

In this cyclone separator, the light fraction is therefore discharged via the flow body, the swirl element and a second flow space arranged around the first flow space. This means that a separator can be realized which is very compact in longitudinal direction, which makes the cyclone separator particularly suitable for wellhead applications. Because optimal use can moreover be made of the available space, a lower pressure drop occurs over the cyclone separator.

According to a further embodiment, the openings are provided in a region close to the downstream end of the flow body. Close to the downstream end of the flow body, the mixture has covered a great distance (or separation length) such that the mixture is well separated.

According to a further embodiment, the flow body has a converging portion at the downstream end thereof so that a gradual discharge of the light fraction can be realized. This form of the flow body moreover prevents a suction effect from the outlet, which could have an adverse effect on the separation result.

In a particular embodiment, the openings in the flow body are provided only in the converging portion of the flow body. No openings are arranged in the other, substantially cylindrical portion of the flow body. Only separation takes place at the position of the cylindrical portion, while discharge takes place at the position of the converging portion. This embodiment is particularly favorable when relatively little gas (less than about 20%) is present in the liquid, in the case of a solid/liquid separator such as a sand/liquid separator.

In another embodiment, in which the flow body has a substantially cylindrical portion and a converging portion, the openings are provided in both the cylindrical portion and converging portion. A first separation therefore already takes place at the position of the cylindrical portion. This embodiment is particularly favorable when a relatively large amount of gas (up to 80% or more) is present in the liquid in the case of a solid/liquid separator such as a sand/liquid separator. It has been found that the separating efficiency increases considerably when openings are arranged not only in the converging portion but also in the cylindrical portion.

According to a further embodiment, the converging portion of the flow body has a substantially conical shape. The inner casing preferably also has a converging form. This produces a heavy fraction outlet with a small cross-section so that the least possible light fraction (for instance, liquid in a sand/liquid separator) is entrained with the heavy fraction (for instance, sand in the sand/liquid separator) and is discharged via the heavy fraction outlet.

According to a further embodiment, the mutual distance between the inner casing and the flow body is substantially constant. This has a stabilizing effect on the flow. When the speed downstream of the swirl elements threatens to decrease as a result of friction, the separator can be embodied so that the mutual distance in flow direction (longitudinal direction) even decreases slightly, which brings about an increase in speed so as to compensate for the decrease in speed resulting from friction.

The non-prepublished application NL 1 028 238 of applicant describes a cyclone separator in which the heavy fraction is discharged via openings arranged in the cyclone tube, while the light fraction continues on its way through the cyclone tube and can be discharged via the outer end thereof. This document also describes a cyclone separator in which the light fraction is discharged by providing discharge openings in the flow body which communicate with a channel extending through the flow body and a discharge pipe connected thereto. The light fraction is discharged via openings in this passage, while the heavy fraction continues on its way through the cyclone tube and can be discharged at the outer end of the cyclone tube.

In both embodiments of the known cyclone separator, the heavy fraction or light fraction must be discharged, respectively, via the wall of the cyclone tube or via the flow body. The part of the heavy fraction that is relatively far removed from the inner surface of the cyclone tube and the part of the light fraction that is relatively far removed from the outer surface of the flow body can, however, be less readily "captured" by the discharge openings, which in some situations has an adverse effect on the separation efficiency of the cyclone. The present subject matter may also reduce or eliminate this drawback.

According to a further aspect, there is provided a cyclone separator in which the discharge means further comprise:
  one or more openings in the swirl element, the openings connecting to the first flow passage; and
  a second flow passage connected to the first flow passage in the at least one swirl element, the second flow passage extending to an outlet for discharge of the heavy or light fraction, the other fraction to be discharged from the outlet of the casing.

An improved discharge of the heavy fraction or the light fraction can be achieved by placing the discharge openings in the swirl element itself. A greater or smaller part of the light or heavy fraction can moreover be discharged as desired by a correct dimensioning and/or positioning of the discharge openings in the swirl element.

It is noted that the openings in the swirl element can be provided instead of the above-mentioned openings in the cyclone tube and/or the flow body. In other embodiments, the discharge openings are provided in the cyclone tube, the swirl element and/or the flow body.

According to one illustrative embodiment, the openings are provided in a circumferential zone adjacent the cyclone tube so as to guide the heavy fraction through the first and second flow passages to the outlet of the second flow passage. When the openings are arranged in this zone, the heavy fraction is therefore discharged via the swirl element. In another embodiment, the openings are provided in a circumferential zone adjacent the flow body so as to guide the light fraction through the first and second passages to the outlet of the second flow passage. In this embodiment, the light fraction is therefore discharged via the swirl element.

According to a further embodiment, the second flow passage is defined inside the flow body, for instance, by making the flow body wholly or partially hollow or by providing one or more channels therein. The relevant fraction (heavy or light fraction) can hereby be discharged in structurally simple manner and without adversely affecting the flow in the flow space around the flow body.

Irrespective of where the openings are arranged in the swirl element, the second flow passage can also be defined between the inner casing and a second outer casing arranged around the inner casing. In this embodiment, the fraction (light or heavy fraction) discharged via the openings is not discharged inward via the flow body but is discharged radially outward via a second flow space present around the above-mentioned flow space. In this embodiment, a very compact construction method can be realized, i.e., the length of the cyclone separator can be relatively short.

BRIEF DESCRIPTION OF THE DRAWINGS

The invention may be understood by reference to the following description taken in conjunction with the accompanying drawings, in which like reference numerals identify like elements, and in which.

Figure 1:
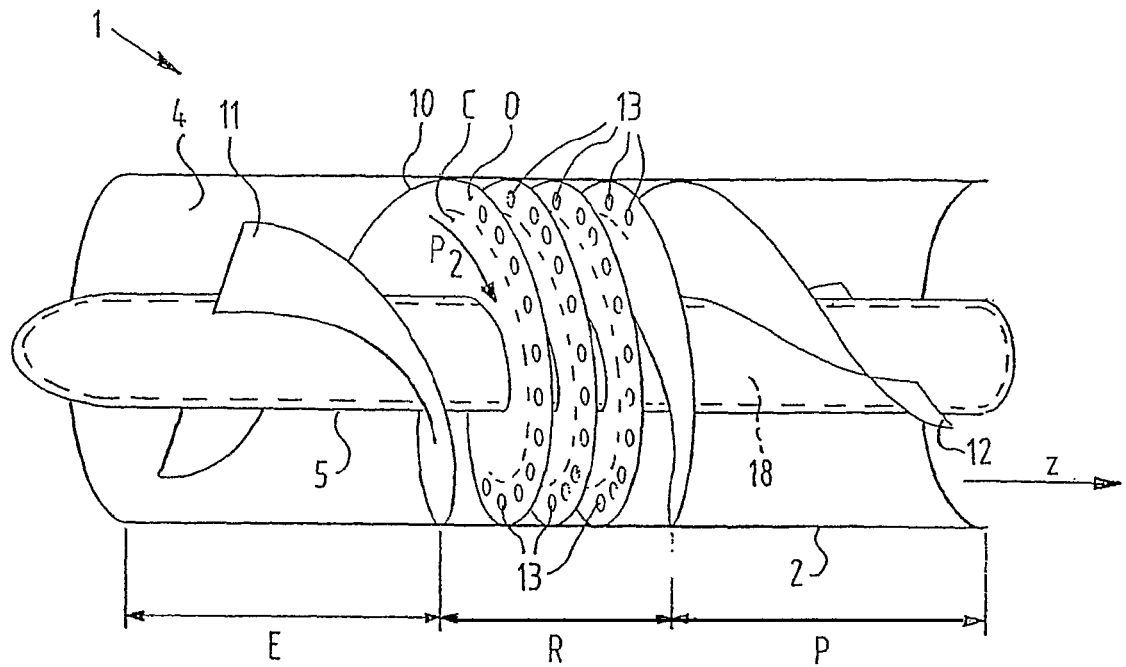
FIG. 1 shows a partially cut-away view in perspective of a first illustrative embodiment of a cyclone separator disclosed herein.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 8:
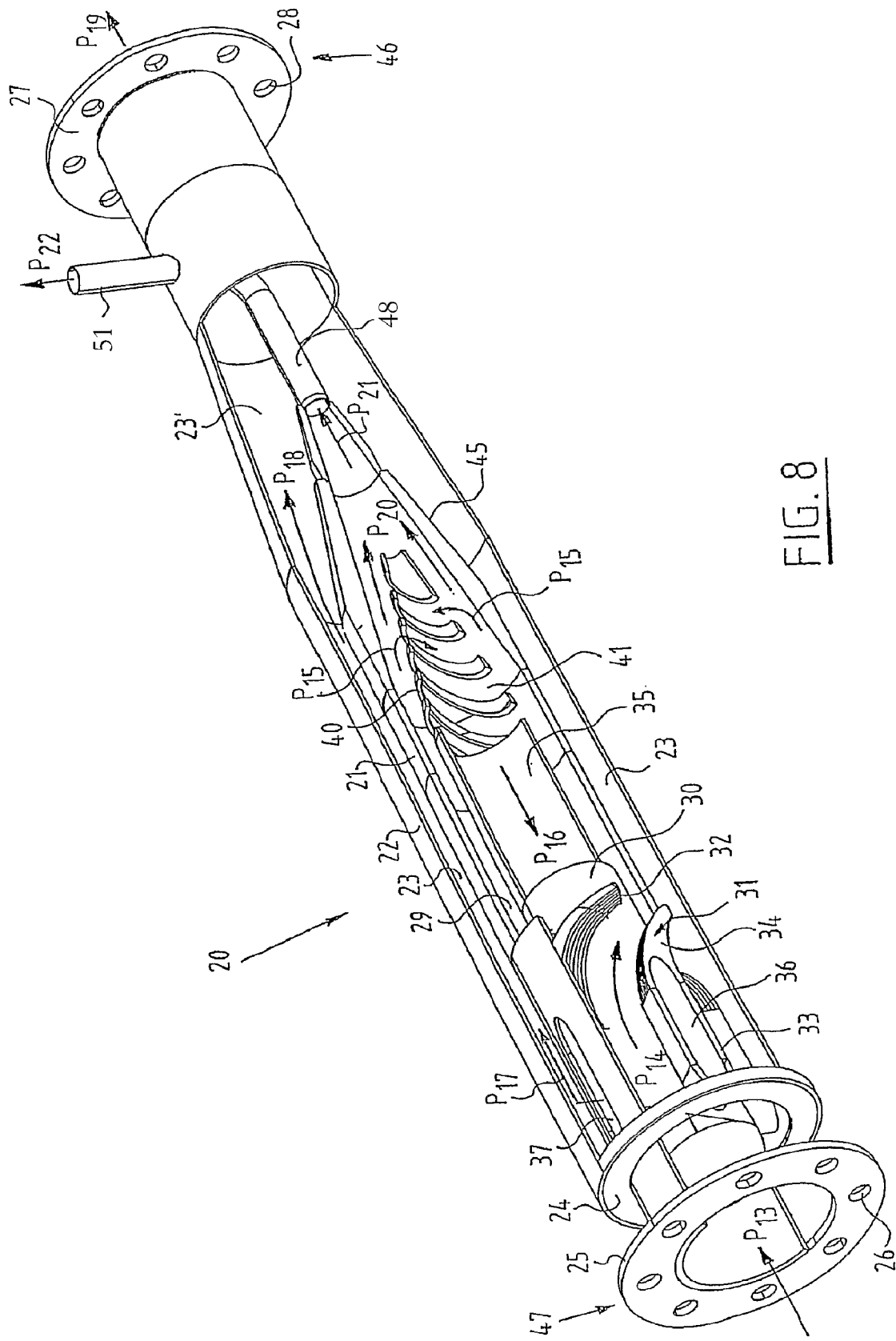
FIG. 8 shows a partially cut-away line drawing in perspective of a fifth illustrative embodiment of a cyclone separator disclosed herein.
Figure 9:
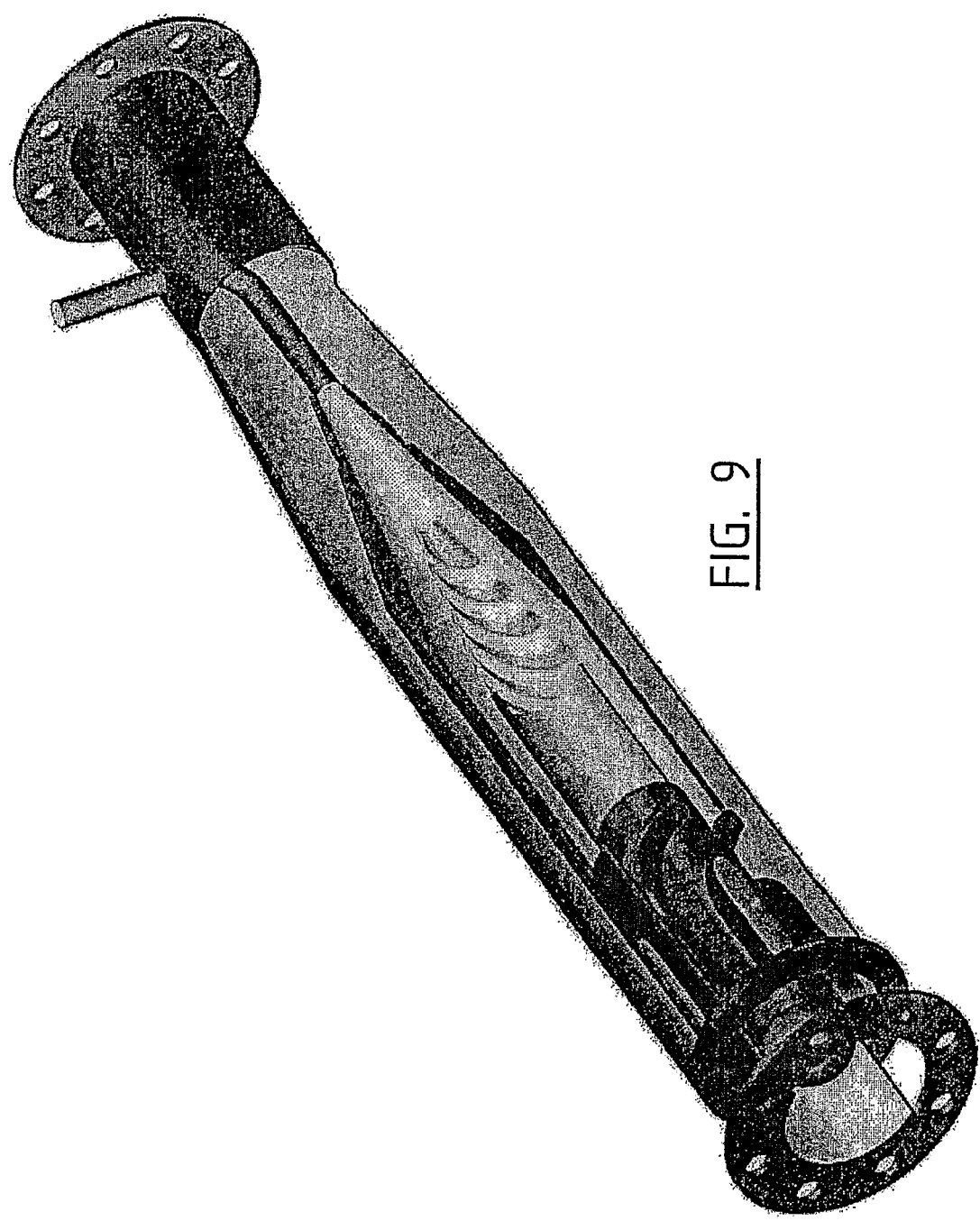
FIG. 9 is a partially cut-away view in perspective of the illustrative embodiment of FIG. 8.
Figure 10:
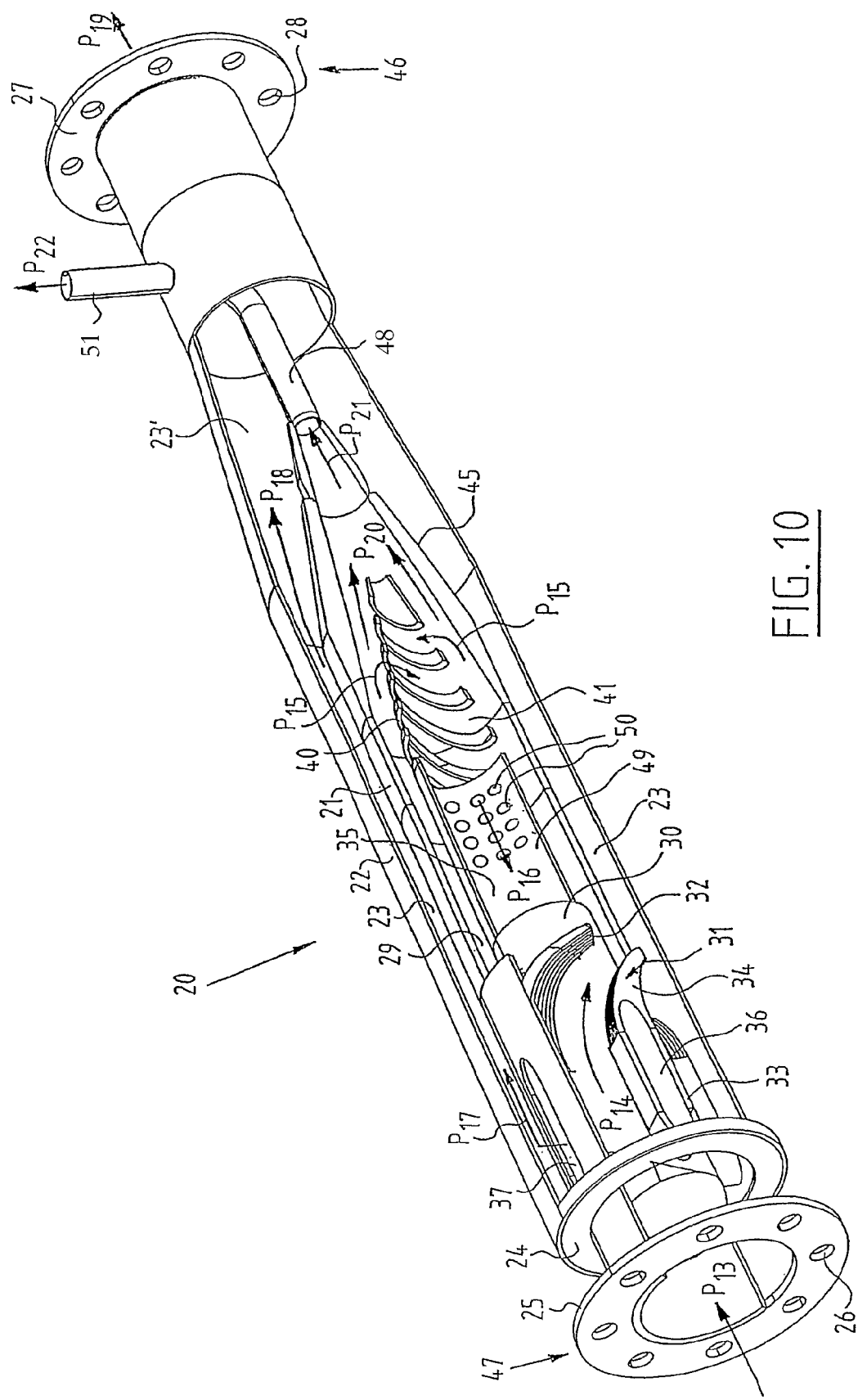
FIG. 10 is a partially cut-away line drawing of a sixth illustrative embodiment of a cyclone separator disclosed herein.

The embodiments of the separators as shown in FIGS. 1-6 are particularly, though not exclusively, intended for separating a gas phase (gas phase vapor) from a liquid phase (water/oil), for instance in a pipeline leading to, for example, an oil platform. As indicated above, the separators can, however, be used to separate the random mixtures of one or more liquids, one or more gases and/or one or more different types of solid particle. FIGS. 8-10, for instance, show separators which are particularly, though not exclusively, suitable for sand/liquid separation (wherein gas may also be present to a greater or lesser extent in the liquid).

Figure 2:
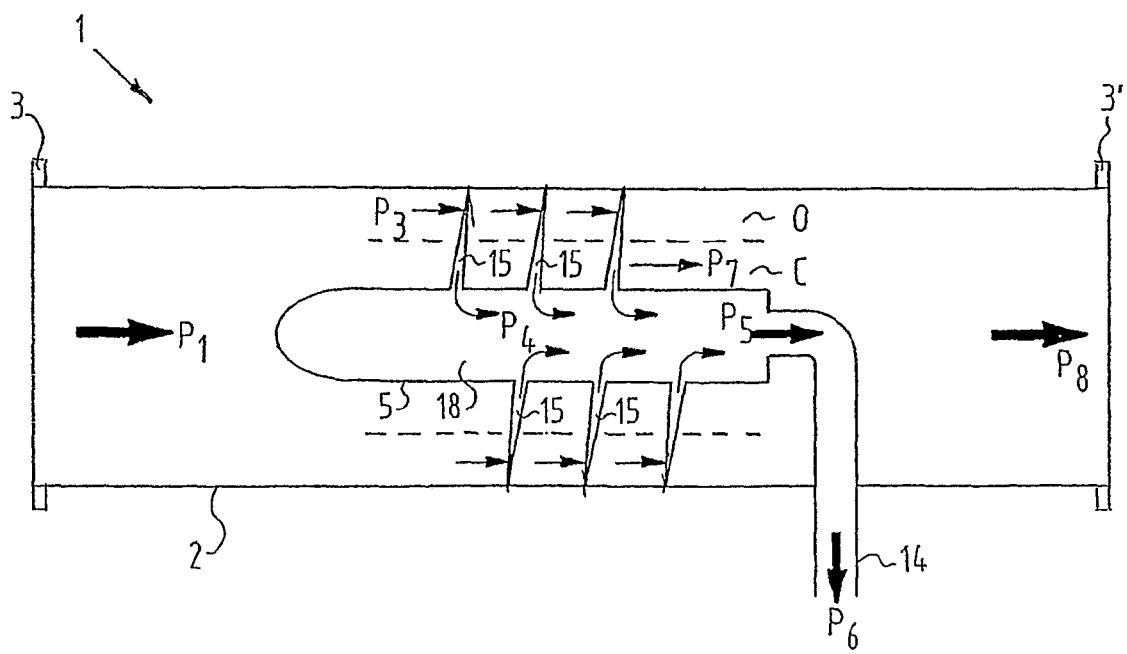
FIG. 2 is a longitudinal section of the illustrative embodiment shown in FIG. 1.

FIGS. 1 and 2 show a first illustrative embodiment of a separator 1 comprising a cyclone tube 2 which is provided at its proximal end with an inlet 3 for connecting to the feed part of a pipeline (not shown). Provided at the distal end of the cyclone tube 2 is an outlet 3' for connecting to a discharge part of the pipeline (not shown). Arranged in the flow space 4 defined in the interior of tube 2 is a central flow body 5 which extends in an axial direction (z-direction as shown in FIG. 1). A curved guide fin 10 is arranged between the inner surface of tube 2 and the outer surface of the flow body 5.

Three different regions are defined between the proximal end 11 and distal end 12 of the guide fin 10. An entry region E is defined extending in a downstream direction from the proximal end. A pressure recovery region P is defined extending in a downstream direction from the rear end 12 of the guide fin 10, while an intermediate region or removal region R is defined in the region between the entry region E and the pressure recovery region P. The function of the guide fin in the entry region E is to set into rotation (as shown by arrow $P_2$ in FIG. 1) the incoming mixture (FIG. 2, $P_1$) flowing along the guide fin 10.

In order to bring about the rotating movement of the mixture, the angle $\alpha$, which is defined as the angle between the axial direction (z-direction) and the guide fin 10 on the outer surface of the flow body 5, begins with a value of about 0 degrees, and this angle increases gradually in order to increase the curvature of the guide fin. In the intermediate region R, the angle $\alpha$ remains constant, or almost constant, in order to allow the mixture to rotate at a more or less equal rotation speed. In the pressure recovery region P, the angle $\alpha$ is gradually reduced from the value in the intermediate region to substantially 0 degrees in order to reduce the rotation of the mixture flowing along the guide fin 10.

In the depicted embodiment, an edge of each guide fin may be fixed to the inner surface of the tube or casing 2, while the opposite edge of the guide fin 10 is fixed to the flow body 5. Other setups are, however, also possible, for instance wherein the guide fins are only fixed to the flow body 5.

In the depicted embodiments, the mixture rotates clockwise. It will be understood that, in other embodiments (not shown), rotation can also take place in a counter-clockwise direction.

As a result of the curvature of the guide fin 10 in the entry region E, a part of the mixture, i.e., the relatively heavy fraction of the mixture, is flung outward by the rotating movement and this part is transported to a substantially annular outer zone O (FIG. 2) once it has reached the intermediate region R. Another part of the mixture, i.e., the relatively lightweight part thereof, will remain in a central zone or core zone C. In FIGS. 1 and 2, the boundary between the outer zone O and zone C is indicated with a broken line. In practice, however, there is no abrupt boundary between the two zones. There is in fact a transition region between the two zones.

The relatively heavy fraction of the mixture which is present in the entry region E in the flow space and which is flung outward eventually comes to lie in the intermediate region R at one or more openings or perforations 13 provided in the guide fin 10. The heavy fraction is discharged ($P_3$) via these openings 13 to a hollow space 15 inside the guide fin 10 and discharged via this hollow space 15 to the inner flow passage 8 provided in the flow body 5. In the depicted embodiment, the flow passage is formed by embodying the flow body 5 at least partially as a hollow tube. In other embodiments (not shown), the passages through the flow body 5 are embodied in one or more channels or tubes arranged in or on the flow body 5.

The inner flow passage can be connected to a discharge pipe 14, via which, in this case, the heavy fraction can be discharged ($P_4$-$P_6$). In the depicted embodiment, the light fraction of the incoming mixture remains in the inner zone C and does not, therefore, come onto that part of the guide fin 10 where openings 13 are situated. The light fraction continues on its way ($P_7$) and is discharged via outlet 3' ($P_8$).

Figure 3:
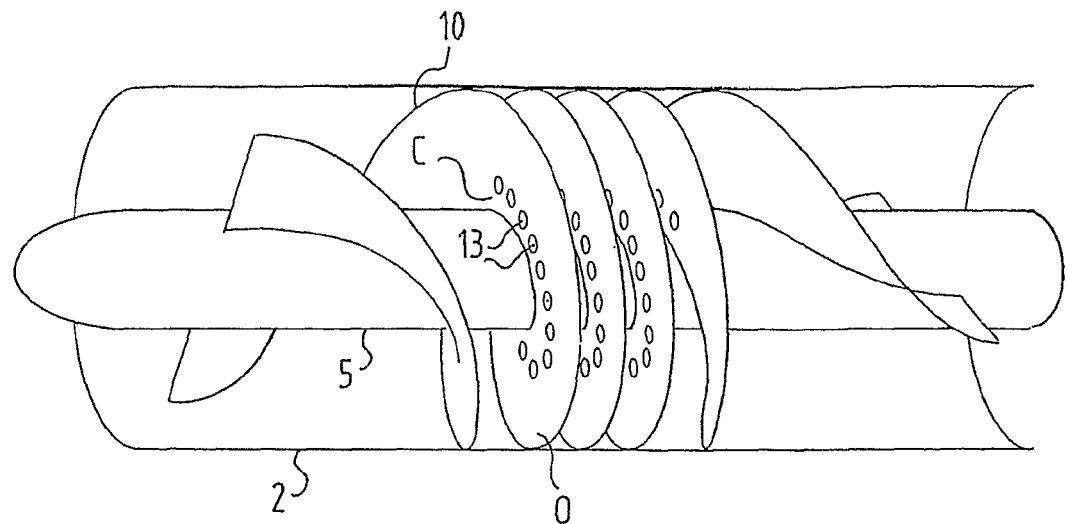
FIG. 3 is a partially cut-away view in perspective of a second illustrative embodiment of a cyclone separator disclosed herein.

FIG. 3 shows a second illustrative embodiment of the separator wherein openings 13 in the guide fin 10 are provided in the inner zone C. Because the openings 13 are provided in this embodiment in the inner zone C, the openings 13 will function as discharge for the light fraction present in this zone C. In a similar manner as described above for the first embodiment, the light fraction that has come to lie in the central region C is discharged via the passage 15 provided in the guide fin 10 and the passage 11 provided in the flow body 5 in the direction of discharge pipe 14, via which the light fraction can be discharged.

Figure 4:
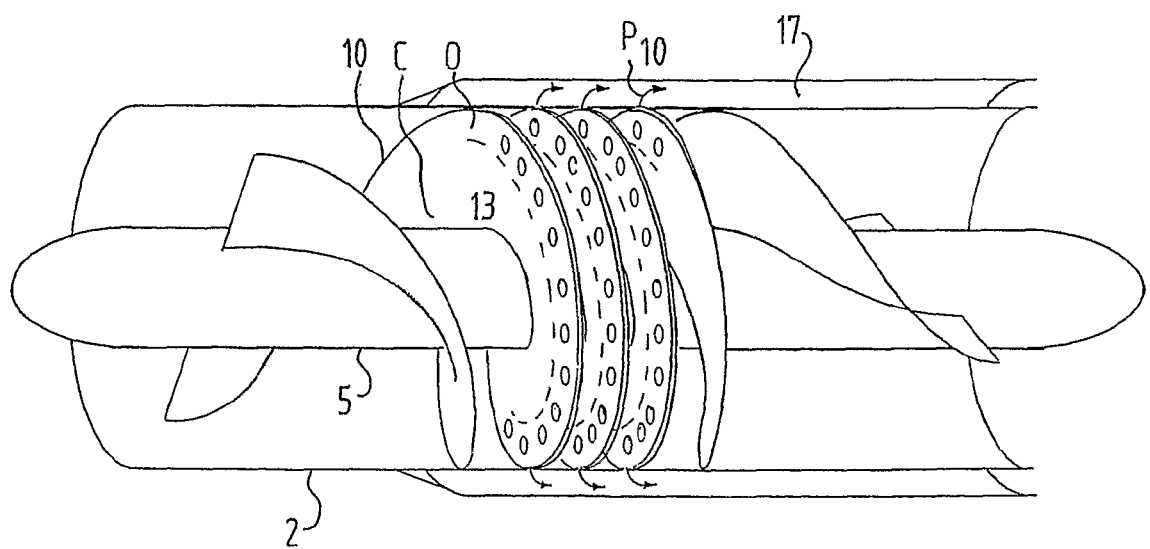
FIG. 4 is a partially cut-away view in perspective of a third illustrative embodiment of a cyclone separator disclosed herein.
Figure 5:
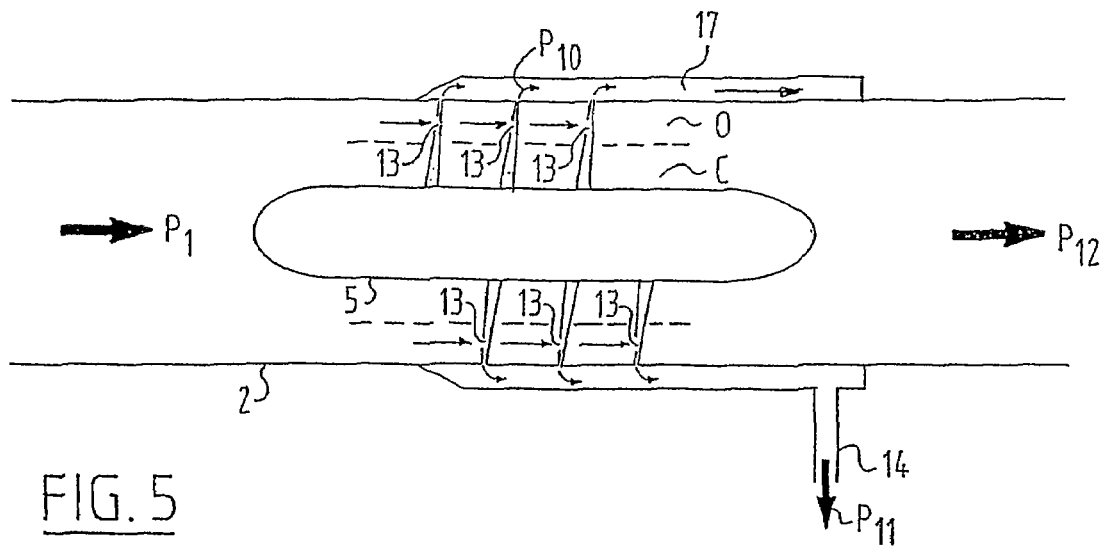
FIG. 5 is a longitudinal section of the illustrative embodiment shown in FIG. 4.
Figure 6:
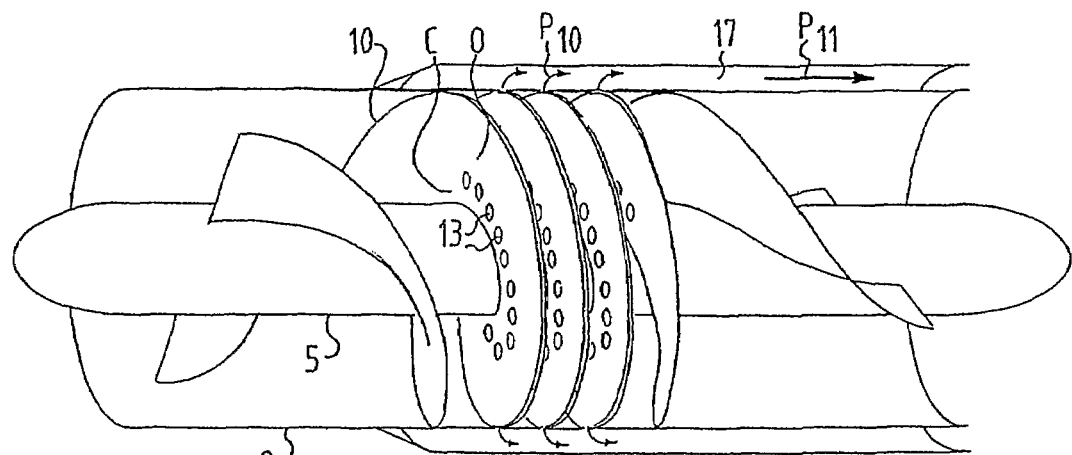
FIG. 6 shows a partially cut-away view in perspective of a fourth illustrative embodiment of a cyclone separator disclosed herein.

FIGS. 4 and 5 show a third illustrative embodiment of the separator in which passage(s) inside the guide fin 10 is (are) in flow connection with a second flow space 17 outside the cyclone tube 2. In this illustrative embodiment, the separated fraction which has entered via the openings 13, instead of being carried radially inward in the direction of the flow body 5, is carried outward in a radial direction to the second flow space 17. When the discharge openings 13 are, for instance, provided in the outer zone O, and the openings therefore discharge the heavy fraction, the heavy fraction is discharged radially outward in the direction of the second flow space 17 ($P_{10}$) and then discharged in longitudinal direction of the separator ($P_{11}$). The light fraction situated in the central area C continues on its way along the first flow space and is discharged at the outer end thereof ($P_{12}$).

Figure 7:
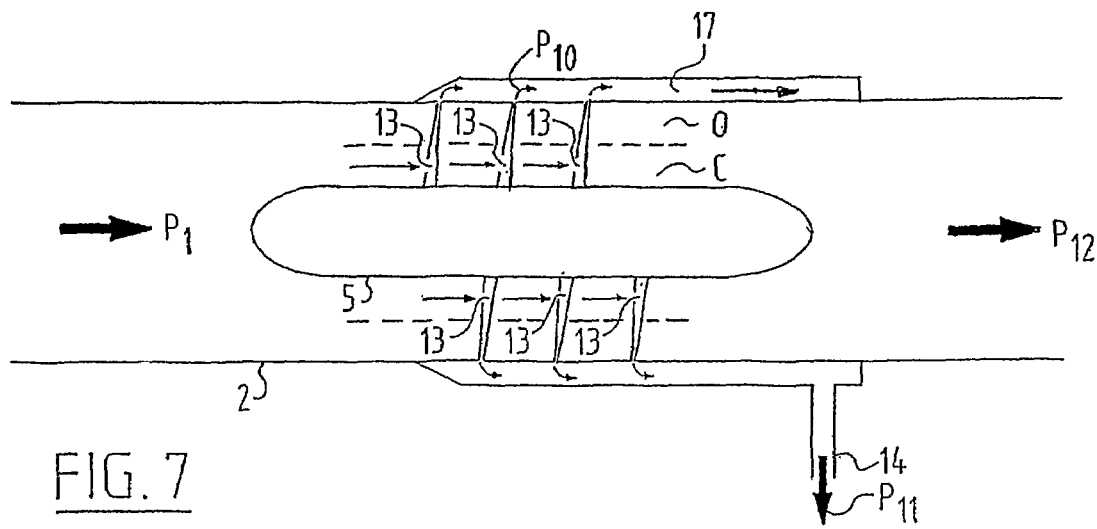
FIG. 7 is a longitudinal section of the illustrative embodiment shown in FIG. 6.

When conversely the discharge openings 13 are provided in the inner central region C, these openings functioned as discharge for the light fraction. This embodiment is shown, for instance, in FIGS. 6 and 7. In this embodiment, the light fraction, having entered the inner space of the guide fin 10, is discharged radially outward ($P_{10}$) in the direction of the second flow space 17 and subsequently discharged in longitudinal direction of the second flow space ($P_{11}$). In the first to the fourth embodiments disclosed above, the calculated separation results, in view of the fact that the cyclone provides a stable flow, are very similar to the measured separation values, which enables a good optimization of the cyclone for a specific application.

The fifth illustrative embodiment shown in FIGS. 8 and 9 likewise has this capability. This illustrative embodiment is particularly suitable for separating a sand/liquid mixture, wherein the light phase (the liquid) is discharged via an inner pipe and the guide fin(s). The cyclone separator 20 consists of an elongate inner tube 21 (shown partially cut-away) and an outer tube 22 arranged concentrically therearound. A flow space 23 is defined between the outer surface of inner tube 21 and the inner surface of outer tube 22. A substantially annular dividing wall 24 is provided at the upstream outer end of the outer and inner tube 22, 21, so that flow space 23 is closed at that end. The dividing wall 24 can be fixed to a flange 25, this flange being provided with fastening openings 26 with which the flange can be fixed to the outer end of a pipe (not shown) of a pipeline. Likewise arranged on the opposite outer end of the separator 20 is a flange 27 provided in similar manner with fastening openings 28 for fixing a following pipe (not shown) of the pipeline. A flow body 30 is arranged in the inner tube 21. In the shown embodiment, this flow body 30 is an elongate tube which has at its upstream outer end a converging, in the shown embodiment conically shaped part 40. For the sake of clarity in the drawing, a part of the tube of the flow body 30 is shown cut away. In reality, however, the flow body 30 is closed (except, of course, for the openings which provide access to the guide fins and openings 41 on the outer end of the flow body, as will be set forth later).

Guide fins 31 and 32 are arranged in the outer surface of the flow body 30 and/or on the inner surface of the inner tube 21. Each of the guide fins 31, 32 comprises an upstream part 33 extending practically in axial direction of the separator 20 and a curved downstream part which ensures that the mixture flowing therealong is set into rotation. In the interior of each of the guide fins 31, 32, preferably (though not limited thereto) in the upstream part 33 thereof, there are provided channels 36 which are connected on one side to the inner space 35 of the flow body 30 and which are connected on the other side via openings 37 to flow space 23 between the inner tube 21 and the outer tube 22.

Openings are arranged at the position of the converging portion 40 of the flow body. In the shown embodiment, the openings are curved slots 41, these openings providing access from flow space 29, which is defined between the outer surface of the flow body 30 and the inner surface of the inner tube 21, to the interior 35 of the flow body 30.

Close to the converging portion 40 of the flow body 30, and in the shown embodiment slightly downstream thereof, the inner tube 21 is likewise provided with the converging portion 45 so that the intermediate distance between the outer surface of the flow body 30 and the inner surface of the inner tube 21 remains almost constant, also in the region where the converging portion 40 of the flow body 30 is situated. The flow space 29 debouches into a discharge pipe 48 which is arranged and extends almost centrally in the flow space and which, in turn, runs out into a discharge pipe 51 along which a part of the mixture can be discharged, as will be set forth below. The flow space 23 between the outer surface of the inner tube 21 and the inner surface of the outer tube 22 debouches into a relatively wide part 23' at the distal end 46 of the separator 20 in order to discharge the part of the mixture flowing therein in the direction of the following part of the pipeline (not shown).

In use, the mixture for separating enters at the proximal end 47 of the separator 20 ($P_{13}$) and passes into the flow space 29. The mixture under pressure continues on its way and flows along the outer side of the flow body 30 until the mixture reaches the guide fins 31, 32. The guide fins 31, 32 set the mixture flowing therealong into rotation ($P_{14}$), whereby, in known manner, the mixture makes a rotating movement in the flow space 29. The relatively heavy parts, for instance the solid particles in a sand/liquid separator, come to lie in a region close to the inner surface of the inner wall 21, while the relatively light parts of the mixture, i.e., in the present embodiment the liquid, comes to lie in a region close to the outer surface of the flow body. When the light fraction reaches the conical outer end 40 of the flow body 30 provided with openings 41, the light fraction is discharged radially ($P_{15}$) and then axially ($P_{16}$) in the direction of the proximal part 47 of the separator. The light fraction is thus sent back in the direction of channels 36 provided in the guide fins. As stated above, there is a free passage between inner space 35 of the flow body 30 and the flow space 23 between the outer tube 22 and the inner tube 21. As a consequence, the light fraction is carried via channels 36 to flow space 23 ($P_{17}$) and subsequently discharged via flow space 23' (direction $P_{18}$) in the direction of the distal end 46 of the separator. There the separated light fraction is discharged ($P_{19}$) via the pipeline (not shown).

The heavy fraction, on the other hand, which as a result of the centrifugal forces makes a rotating movement close to the inner surface of the inner tube 21, remains in flow space 29 and enters ($P_{20}$ and $P_{21}$) the above-mentioned discharge tube 48. This discharge tube 48 discharges the heavy fraction via outlet 51 ($P_{22}$). In this manner, a very compact separator can be realized which is fully aligned with the pipeline (a so-called in-line separator).

FIG. 10 shows a sixth illustrative embodiment of the cyclone separator. This embodiment is almost wholly similar to the fifth embodiment of the separator described above, so that a detailed description of the operation of the separator, to the extent it is the same as that of the fifth embodiment, can be dispensed with here. In the present embodiment, not only are openings 41 arranged in the distal part 40 of the flow body, but openings 50 are also provided in the more proximally located cylindrical portion 49 of the flow body. Particularly when the light phase (liquid/gas in a solid/liquid separator) contains a relatively large amount of gas, the additional openings 50 in the flow body produce an improved discharge of the light fraction, which enhances the separation efficiency to be achieved by the cyclone separator.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A cyclone separator for separating a mixture comprising liquid and/or gas into a heavy fraction and a light fraction, the cyclone separator comprising:
   an inner casing defining a flow space through which the mixture is to flow, the inner casing having an inlet for the mixture to be separated and an outlet for the discharge of either the heavy or light fraction of the mixture;
   an elongated flow body arranged in the flow space along which the mixture to be separated can be carried;
   at least one swirl-inducing element arranged between the elongated flow body and the inner casing, the at least one swirl-inducing element being curved so as to set the incoming mixture into a rotating movement for the purpose of separating the mixture into the heavy fraction and the light fraction;
   at least one first flow passage defined inside said at least one swirl-inducing element, the at least one first flow passage comprising at least one enclosed flow channel adapted to permit flow between the inside of the elongated flow body and the outside of the inner casing;
   a second flow passage defined inside the elongated flow body and connecting to the at least one first flow passage in the at least one swirl-inducing element;
   an outer casing arranged around the inner casing, the outer and inner casing defining a third flow passage connected to the at least one first flow passage; and
   discharge means for discharging the separated heavy and light fraction, the discharge means comprising the at least one first flow passage, the second flow passage, the third flow passage, and one or more openings in the elongated flow body, wherein the one or more openings connect to the second flow passage inside the elongated flow body so as to discharge the separated light fraction from said cyclone separator via a flow path sequentially comprising at least the openings, the second flow passage, the at least one first flow passage, and the third flow passage, respectively.

2. The cyclone separator as claimed in claim 1, wherein the openings in the elongated flow body are downstream of the at least one swirl-inducing element.

3. The cyclone separator as claimed in claim 2, wherein the elongated flow body has a converging portion at the downstream end thereof.

4. The cyclone separator as claimed in claim 3, wherein the converging portion has a substantially conical shape.

5. The cyclone separator according to claim 1, wherein the elongated flow body includes a substantially cylindrical portion and a converging portion, the openings being provided in both the cylindrical portion and converging portion.

6. The cyclone separator as claimed in claim 1, wherein the inner casing has a converging portion.

7. The cyclone separator as claimed in claim 1, wherein the mutual distance between the inner casing and the elongated flow body is substantially constant along the separator.

8. A method of separating a mixture containing liquid and/or gas into a heavy fraction and a light fraction, the method comprising the steps of:
   providing a cyclone separator comprising:
      an inner casing defining a flow space through which the mixture is to flow, the inner casing having an inlet for introducing the mixture to be separated and an outlet for discharging the heavy fraction of the mixture;
      an elongated flow body arranged in the flow space along which the mixture to be separated can be carried;
      at least one swirl-inducing element arranged between the elongated flow body and the inner casing, the at least one swirl-inducing element being curved so as to set the incoming mixture into a rotating movement for the purpose of separating the mixture into the heavy fraction and the light fraction;
      discharge means for discharge of the light fraction, the discharge means comprising at least one first flow passage defined inside said at least one swirl-inducing element, second flow passage defined inside the elongated flow body and connecting to the at least one first flow passage in the at least one swirl-inducing element, at least one third flow passage connected to the at least one first flow passage, the third flow passage being defined between an outer casing arranged around the inner casing, and one or more openings in the elongated flow body, the one or more openings connecting to the second flow passage inside the elongated flow body, wherein the at least one first flow passage comprises at least one enclosed flow channel adapted to permit flow between the inside of the elongated flow body and the outside of the inner casing;
   guiding the mixture to be separated to the flow space through the inlet;
   setting the mixture into a rotating movement, causing the mixture to be separated into a heavy fraction and a light fraction;
   guiding the separated light fraction through the openings in the elongated flow body;

guiding the light fraction backwards through the second passage inside the elongated flow body;

guiding the light fraction from the second passage through the at least one first passage in the at least one swirl-inducing element;

discharging the light fraction through the third passage between the outer and inner casing; and discharging the heavy fraction through said outlet of the inner casing.

9. The cyclone separator as claimed in claim 1, wherein the inner and outer casings are substantially tubular and the passage between the inner and outer casing is substantially annular.

10. The cyclone separator as claimed in claim 1, wherein the at least one or more first openings in the at least one or more swirl-inducing elements are elongated openings extending in a substantially axial direction.

11. The cyclone separator as claimed in claim 1, wherein the separator is adapted to be arranged between pipes of a pipeline so as to constitute a part of a pipeline.

12. The cyclone separator as claimed in claim 11, wherein the separator can be mounted so as to be aligned with the pipeline.

13. A cyclone separator for separating a mixture comprising liquid and/or gas into a heavy fraction and a light fraction, said cyclone separator comprising:

an outer casing comprising a first outlet adapted for the discharge of said light fraction, said outlet disposed proximate a downstream end of said cyclone separator;

an inner casing disposed inside of said outer casing, said inner casing comprising an inlet for said mixture, said inlet disposed proximate an upstream end of said cyclone separator, said inner casing further comprising a second outlet adapted for the discharge of said heavy fraction, said second outlet disposed remote from said upstream end of said cyclone separator, wherein a first space between said inner casing and said outer casing defines a first flow passage;

an elongated flow body disposed inside of said inner casing, said elongated flow body defining at least one second flow passage therein and comprising at least one opening disposed remote from an upstream end thereof, wherein a second space between said elongated flow body and said inner casing defines a third flow passage through which said mixture flows from said inlet, and said at least one opening is adapted to permit flow from said third flow passage to said second flow passage; and at least one guide fin disposed in said second space adjacent said inlet, said at least one guide fin comprising at least one enclosed flow channel defining at least one fourth flow passage inside said guide fin, said at least one fourth flow passage being adapted to permit flow from said second flow passage to said first flow passage, said at least one guide fin further comprising a substantially axial upstream portion and a substantially curved downstream portion wherein said substantially curved downstream portion is adapted to initiate a rotational flow of said mixture flowing from said inlet through said third flow passage.

* * * * *